United States Patent
Edwards

(10) Patent No.: US 10,321,055 B2
(45) Date of Patent: Jun. 11, 2019

(54) LOW POWER EYE TRACKING SYSTEM AND METHOD

(71) Applicant: Seeing Machines Limited, Fyshwick (AU)

(72) Inventor: Timothy James Henry Edwards, Kallista (AU)

(73) Assignee: Seeing Machines Limited, Braddon (AU)

( * ) Notice: Subject to any disclaimer, the term of this patent is extended or adjusted under 35 U.S.C. 154(b) by 322 days.

(21) Appl. No.: 14/916,449

(22) PCT Filed: Sep. 3, 2014

(86) PCT No.: PCT/AU2014/000876
§ 371 (c)(1),
(2) Date: Mar. 3, 2016

(87) PCT Pub. No.: WO2015/031942
PCT Pub. Date: Mar. 12, 2015

(65) Prior Publication Data
US 2016/0198091 A1 Jul. 7, 2016

(30) Foreign Application Priority Data
Sep. 3, 2013 (AU) ............................... 2013903353

(51) Int. Cl.
*H04N 5/232* (2006.01)
*G06F 3/01* (2006.01)
(Continued)

(52) U.S. Cl.
CPC ....... *H04N 5/23241* (2013.01); *G06F 1/3206* (2013.01); *G06F 3/013* (2013.01);
(Continued)

(58) Field of Classification Search
CPC .............. H04N 5/23241; H04N 5/2256; G06F 1/3206; G06F 3/013
See application file for complete search history.

(56) References Cited

U.S. PATENT DOCUMENTS

2008/0089480 A1* 4/2008 Gertner ................ A61N 5/1017
378/65
2008/0199165 A1 8/2008 Ng et al.
(Continued)

FOREIGN PATENT DOCUMENTS

EP 2466905 A2 6/2012
EP 2587341 A1 5/2013
(Continued)

*Primary Examiner* — Mishawn N Hunter
(74) *Attorney, Agent, or Firm* — Jason P. Mueller; Adams and Reese, LLP

(57) ABSTRACT

A method of reducing the illumination power requirements for an object tracking system, the method including the steps of: (a) determining a current location of the object within a scene; (b) for a future frame: determining a band around the object of interest; determining a start and stop time for when the rolling shutter detector will be sampling the band; and illuminating the object only while the rolling shutter detector is sampling the band; (c) for a future frame predicting the location of the object relative to the tracking system; determining the ambient light levels; and illuminating the object with the minimum optical power required for the object to be imaged suitably for tracking.

11 Claims, 7 Drawing Sheets

(51) Int. Cl.
  *G06K 9/00*    (2006.01)
  *H04N 5/225*   (2006.01)
  *G06F 1/3206*  (2019.01)
  *G06K 9/46*    (2006.01)

(52) U.S. Cl.
  CPC ..... *G06K 9/00255* (2013.01); *G06K 9/00604* (2013.01); *H04N 5/2256* (2013.01); *G06K 2009/4666* (2013.01)

(56) References Cited

U.S. PATENT DOCUMENTS

| | | | | |
|---|---|---|---|---|
| 2008/0297588 | A1* | 12/2008 | Kurtz | H04N 7/147 |
| | | | | 348/14.08 |
| 2010/0001926 | A1 | 1/2010 | Amirparviz | |
| 2010/0066975 | A1 | 3/2010 | Rehnstrom | |
| 2011/0310238 | A1 | 12/2011 | Koh et al. | |
| 2012/0242961 | A1* | 9/2012 | Miura | G02B 27/0961 |
| | | | | 353/38 |
| 2013/0106681 | A1* | 5/2013 | Eskilsson | G06K 9/00597 |
| | | | | 345/156 |
| 2013/0169683 | A1* | 7/2013 | Perez | G02B 27/02 |
| | | | | 345/633 |
| 2013/0178287 | A1* | 7/2013 | Yahav | G02B 27/01 |
| | | | | 463/32 |
| 2014/0125813 | A1* | 5/2014 | Holz | G06K 9/00375 |
| | | | | 348/169 |
| 2015/0370320 | A1* | 12/2015 | Connor | A61B 5/6831 |
| | | | | 345/173 |

FOREIGN PATENT DOCUMENTS

| | | |
|---|---|---|
| JP | 2010-511281 | 4/2010 |
| JP | 2010-176382 | 8/2010 |
| WO | 1999027412 A1 | 6/1999 |
| WO | 2008066460 | 6/2008 |

* cited by examiner

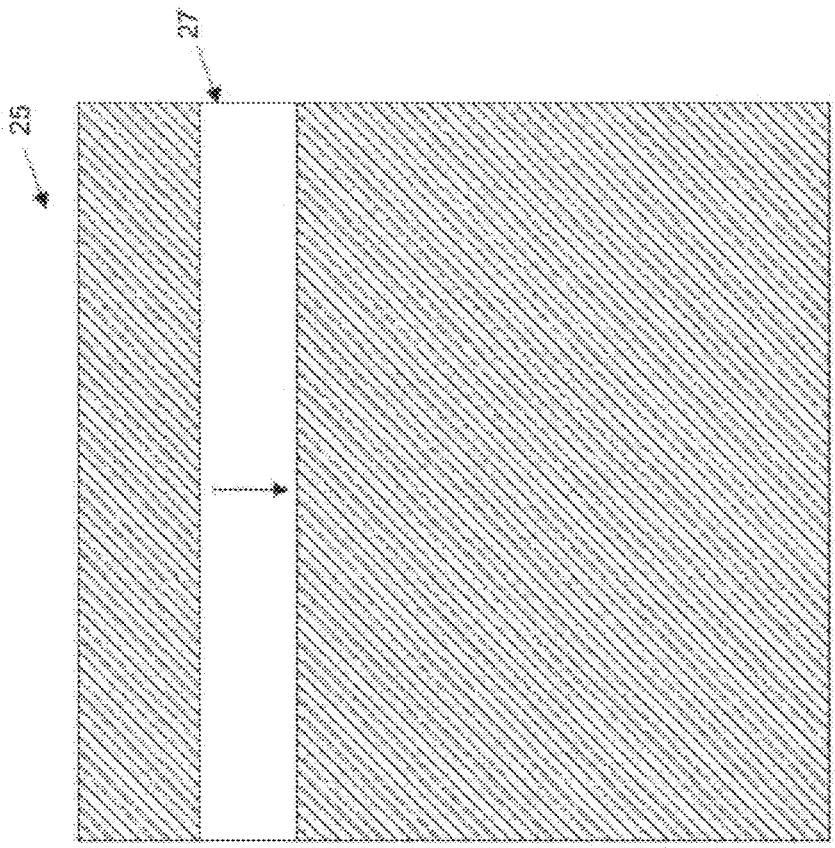
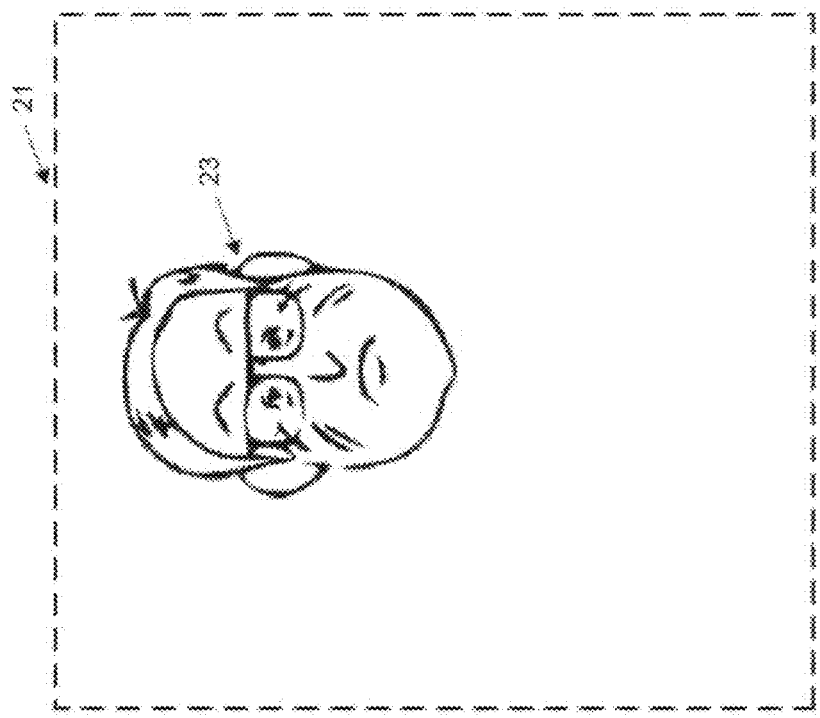
Fig. 3

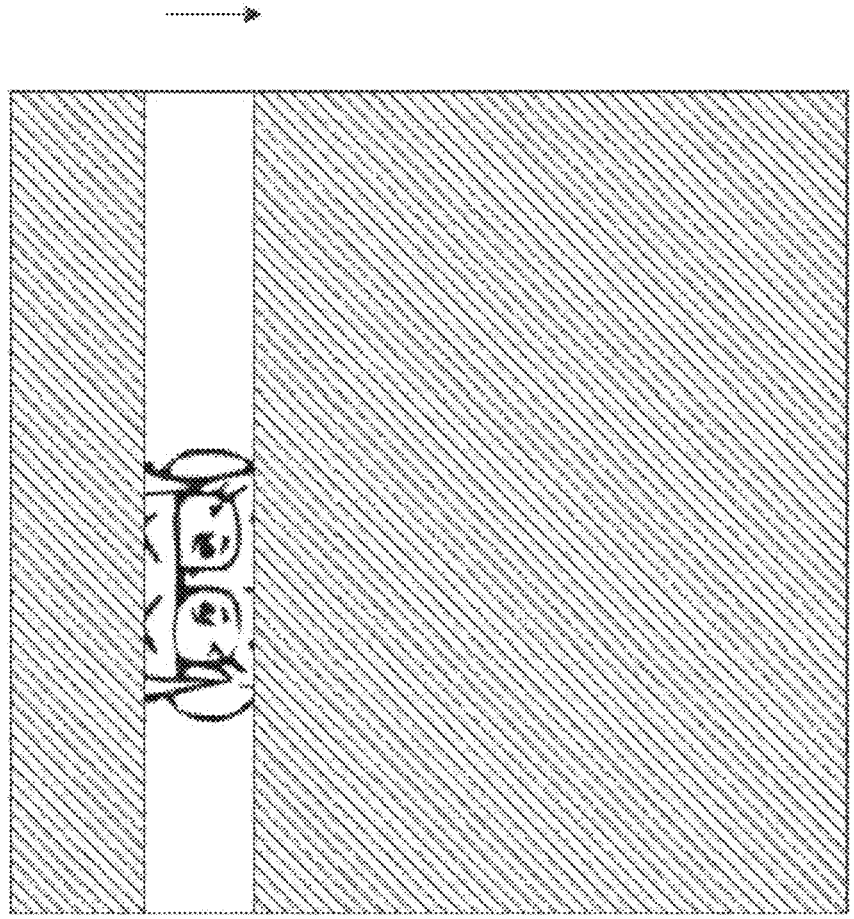
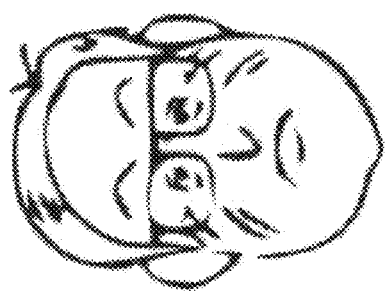
Fig. 4

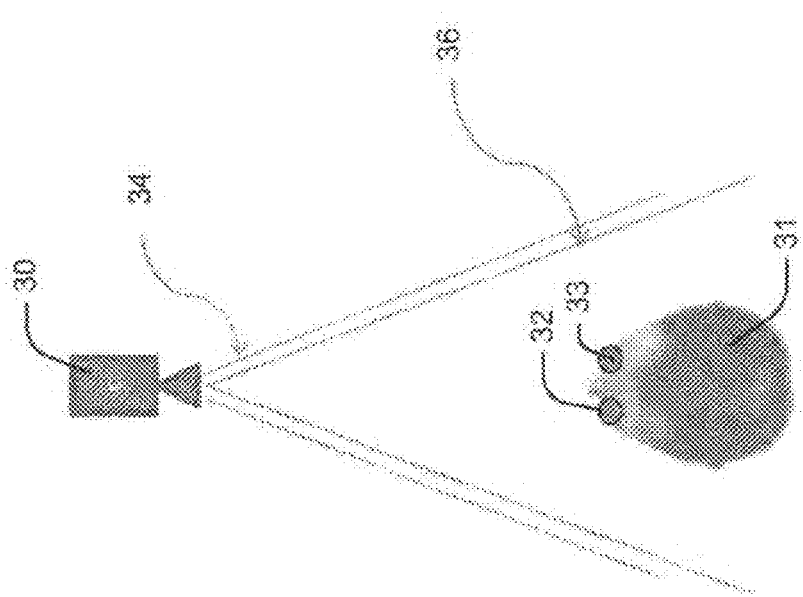

LOW POWER EYE TRACKING SYSTEM AND METHOD

FIELD OF THE INVENTION

The present invention relates to the low power monitoring of objects utilising an image sensor and one or more light sources. Particular embodiments of the invention have been developed to track the location of a user's eye direction on a mobile device such as an iPhone or a driver's gaze when driving a vehicle.

BACKGROUND

Any discussion of the background art throughout the specification should in no way be considered as an admission that such art is widely known or forms part of common general knowledge in the field.

A significant issue with embedding eye-tracking technology into mobile devices is the significant amount of power required to illuminate the eye sufficiently in order to create a bright reflection from the cornea surface able to be detected by an eye tracking algorithm under conditions of normal use for a hand-held device such as a mobile phone including at different distances from the eye, use in the outdoors, or whilst wearing sunglasses. This power requirement may be in the order of several watts which makes eye-tracking a prohibitively inefficient feature.

The need to power illumination devices to allow for proper eye-tracking system operation has significant draw backs. For example, light emitting diodes (LEDS) are only about 20% efficient at converting electrons into infrared photons, the rest of the energy is dissipated as heat. Beyond draining the battery quickly, the LEDs have the secondary effect of heating the mobile device, which is undesirable for many reasons. Specifically, when used in a hot vehicle cabin, the additional heating of the LEDs can push the device to failure or reduced efficiency unless expensive heat sinks are added.

In addition for eye tracking, it is desirable to maximize the ratio of the controlled IR light from illumination sources relative to the uncontrolled environmental light such as the sun or other sources of light such as lamps or displays. The higher this ratio, the less likely it is for an eye tracking algorithm to fail to locate the reflection on the cornea correctly. The sun in particular creates very strong reflections on the eye and so when tracking the eye outdoors, it is desirable to have very bright light illuminating the eye in order to combat these environmental reflections.

A first form of sensor, called a "rolling shutter" sensor (also known as a progressive scan sensor), operates by exposing each row of pixels in the image sequentially. This requires the illuminators to be powered (active) whilst each row of pixels on the sensor is integrating light. Consequently the illuminators are required to be active for the entire frame period in order to expose the whole image correctly. For example if the sensor is producing a new image every 33 ms (30 Hz) the illuminators will need to be active for the entire 33 ms, even if each pixel only requires 5 ms of time in order to integrate photons sufficiently.

Another form of sensor, called a "global-shutter" sensor, the entire array of pixels is imaged simultaneously, which is desirable from a power saving perspective as it allows the illuminated light to be pulsed in a short-duration high-intensity flash. Referring to the example above, the illuminators would only need to be active for the 5 ms pixel integration time. Therefore global shutter sensors offer significant power saving advantages for eye tracking.

However there are many other aspects (including complexity, size, cost, sensitivity and noise performance) as to why global-shutter sensors are considered inferior to progressive-scan sensors for mobile device designs.

US Patent Application Publication 2010/0066975 to Rehnstrom entitled "Eye Tracking Illumination" makes some preliminary suggestions on how to contain power usage in eye tracking systems and also suggests controlling the beam direction when illuminating eyes. However, Rehnstrom does not consider the operation of different camera sensors and does not specifically take into account the distance of a subject's eyes from the camera/illuminator. Accordingly, only limited power reduction can be achieved.

SUMMARY OF THE INVENTION

It is an object of the invention, in its preferred form to provide an improved form of low power eye tracking, suitable for use in a mobile environment.

In accordance with a first aspect of the present invention, there is provided a method of reducing the illumination power requirements for an object tracking system, the method including the steps of:
  (a) controlling one or more illumination devices to illuminate the object with a beam of radiation having a predefined beam shape for a predetermined time period at a predefined power level;
  (b) during the predetermined time period, controlling a camera to capture an image of the illuminated object;
  (c) processing the image to estimate the three dimensional location of the object, including a distance of the object from the camera;
  (d) based on the estimated three dimensional location of the object, selectively varying one or more of:
    (i) a start and/or end time of the predetermined time period;
    (ii) the predefined power level;
    (iii) the beam shape to focus the beam at a position and distance corresponding to the object.

In one embodiment, the object is a human face. In another embodiment, the object is at least one eye.

The beam shape is preferably selectively varied by controlling a dynamic beam shaping element. The dynamic beam shaping element preferably includes one or more electronically controllable optical elements. More preferably, the dynamic beam shaping element includes one or more of an electro optic lens, microelectronic mirror (MEMS) arrays, liquid crystal phase modulators, interference-based optics, phased arrays, dynamic diffractive elements, prisms.

The step of selectively varying the predefined power level preferably includes activating or deactivating one or more illuminating devices. The illuminating devices preferably include infrared LEDs.

The predefined power level is preferably a minimum power level required to detect the object. The minimum power level is preferably determined based on a lighting model of the object. The lighting model is preferably constructed from a statistical analysis through observations of the object under various illumination conditions.

The predefined power level is preferably further selectively varied based on an ambient light detection.

In one embodiment, the camera includes a two-dimensional array of photosensors and a corresponding array of shutters which are selectively actuated in a sequential manner. In another embodiment, the camera includes a two-dimensional array of photosensors and a single actuatable shutter to simultaneously expose each photosensor.

In accordance with a second aspect of the present invention, there is provided a method of reducing the illumination power requirements for an imaging sensor an object tracking system, the method including the steps of:
(a) determining a current location of an object of interest within a scene;
(b) for a future frame:
  determining a region around the object of interest; and
  localising the projection of illumination energy to the region.

Preferably, the localisation is either spatial to the region and temporal whilst the rolling shutter detector is scanning the region.

In accordance with a third aspect of the present invention, there is provided a method of reducing the illumination power requirements for a rolling shutter detector object tracking system, the method including the steps of:
(a) for a first frame, determining a current location of the object within a scene;
(b) for a subsequent frame:
  determining a band around the object of interest;
  determining a start and stop time for when the rolling shutter detector will be sampling the band; and
  illuminating the object only whilst the rolling shutter detector is sampling the band.

The step (b) can be iteratively applied. The object can be a human face. The object can be at least one eye. The band preferably can include an upper and lower buffer for potential movement of the object within the scene.

The method according to the third aspect preferably further comprises actively managing illumination power requirements based on the sensed location of the object relative to the tracking system. The method preferably further comprises actively managing illumination power requirements based on the environmental lighting conditions. The active management preferably includes at least one of:
  modulation of the illumination power;
  controlling the number of active emitting illumination sources;
  dynamically focusing the illumination emission in the direction of the object.

The effectiveness of the method according to the third aspect can be improved by applying various constraints on the object to be detected. For example, determination of the minimum necessary power levels for illuminating the object can be computed from a number of constraints including (i) an empirically derived control model to determine the degree of light illumination to achieve a suitable image of the object for tracking based on the object's measured position and orientation from the light source and the sensor array (ii) optional prior knowledge of the reflective properties of the object at the wavelength of the illumination source (iii) an optionally predicted location of the object in three-dimensional space relative to the sensor in the next frame and (iv) an optional measurement of the ambient light illumination levels in order to compensate for potentially interfering reflections on the object.

In accordance with a fourth aspect of the present invention, there is provided a method for controlling the output power of an illuminating device in an eye tracking system, the method including the steps of:
(a) controlling the illuminating device to illuminate at least a region of a subject at an output power level, the region including one or both of the subject's eyes for a predetermined time period;
(b) during the predetermined time period, controlling a camera to capture an image of the illuminated subject;
(c) processing the image to estimate the three dimensional location of one or both of the eyes in the image, including the distance of one or both of the eyes from the camera;
(d) based on the estimated distance, selectively increasing or decreasing the output power level of the illuminating device for future illumination of the subject.

Preferably the illuminating device includes a plurality of LEDs and the step of increasing or decreasing the predefined output power level includes activating or deactivating one or more of the LEDs.

In accordance with a fifth aspect of the present invention, there is provided a method for dynamically controlling an illumination beam shape in an eye tracking system, the method including the steps of:
(a) controlling an illumination device to illuminate at least a region of a subject with a beam of radiation having a predefined beam shape for a predetermined time period, the region including one or both of the subject's eyes;
(b) during the predetermined time period, controlling a camera to capture an image of the illuminated region;
(c) processing the image to estimate the three dimensional location of one or both of the eyes, including the distance of one or both of the eyes from the camera;
(d) in response to the estimated three dimensional location of one or both of the eyes, controlling a dynamic beam shaping element to selectively adjust the illumination beam shape to focus the beam at a position and distance corresponding to one or both of the subject's eyes.

In accordance with a sixth aspect of the present invention, there is provided a method of reducing the illumination power requirements for an object tracking system, the method including the steps of:
(a) controlling one or more illumination devices to illuminate the object for a predetermined time period;
(b) during the predetermined time period, controlling a camera to capture an image of the illuminated object;
(c) processing the image to estimate a three dimensional location of the object, including a distance of the object from the camera; and
(d) based on the estimated distance, adjusting the predetermined time period for illumination of subsequent images.

In accordance with a seventh aspect of the present invention, there is provided a computer program configured to perform a method according to any one of the preceding aspects.

In accordance with an eighth aspect of the present invention, there is provided a computer system configured to perform a method according to any one of aspects one to six.

In accordance with a ninth aspect of the present invention, there is provided a device configured to perform a method according to any one of aspects one to six.

In accordance with a tenth aspect of the present invention, there is provided a system for reducing the illumination power requirements for object tracking, the system including:
(a) one or more illumination devices to illuminate the object with a beam of radiation having a predefined beam shape for a predetermined time period at a predefined power level;

(b) a camera to capture an image of the illuminated object during the predetermined time period; and
(c) a processor configured to:
  (i) process the image to estimate the location of the object and the distance of the object from the camera; and
  (ii) based on the estimated location and distance of the object, selectively varying one or more of:
    (1) a start and/or end time of the predetermined time period;
    (2) the predefined power level;
    (3) the beam shape to focus the beam at a position and distance corresponding to the object.

In accordance with a eleventh aspect of the present invention, there is provided a system for controlling the output power of an illuminating device for eye tracking, the system including:
(a) an illuminating device configured to illuminate at least a region of a subject at an output power level, the region including one or both of the subject's eyes for a predetermined time period;
(b) a camera to capture an image of the illuminated region during the predetermined time period; and
(c) a processor configured to:
  (i) process the image to estimate the three dimensional location of one or both of the eyes in the image, including the distance of one or both of the eyes from the camera; and
  (ii) based on the estimated distance, selectively increase or decrease the output power level of the illuminating device for future illumination of the subject.

In accordance with a twelfth aspect of the present invention, there is provided a system for dynamically controlling an illumination beam shape for eye tracking, the system including:
(a) an illumination device configured to illuminate at least a region of a subject with a beam of radiation having a predefined beam shape for a predetermined time period, the region including one or both of the subject's eyes;
(b) a camera to capture an image of the illuminated region during the predetermined time period; and
(c) a processor configured to:
  (i) process the image to estimate the three dimensional location of one or both of the eyes, including the distance of one or both of the subject's eyes from the camera; and
  (ii) in response to the estimated three dimensional location of one or both of the eyes, controlling a dynamic beam shaping element to selectively adjust the illumination beam shape to focus the beam at a position and distance corresponding to one or both of the subject's eyes.

In accordance with a thirteenth aspect of the present invention, there is provided a system of reducing the illumination power requirements for object tracking, the system including:
(a) one or more illumination devices configured to illuminate the object for a predetermined time period;
(b) a camera to capture an image of the illuminated object during the predetermined time period; and
(c) a processor configured to:
  (i) process the image to estimate a three dimensional location of the object, including a distance of the object from the camera; and
  (ii) based on the estimated distance, adjust the predetermined time period for illumination of subsequent images.

BRIEF DESCRIPTION OF THE DRAWINGS

Embodiments of the invention will now be described, by way of example only, with reference to the accompanying drawings in which:
FIGS. 3 and 4 illustrate schematically the operation of a rolling shutter detector;
FIG. 5 illustrates a schematic plan view of camera view frustum and LED illumination beam width with reference to a subject's head, wherein the beam width is matched with the camera view frustum.

DETAILED DESCRIPTION

The preferred embodiment provides for a low power automatic tracking system for tracking a person's eye or eyes from a hand-held device, with an image sensor and infra-red (IR) illumination system consisting of one or more IR light emitting diodes (LED)s. However, it will be appreciated that the invention relates more generally to the detection and tracking of objects within an image or sequence of images. The tracking is intended to be performed in real or near-real time.

The preferred embodiments are directed to power saving techniques that provide dynamic control over the IR illumination in order to (i) minimize the amount of time the IR LEDs are active; and to (ii) minimize the power level of the IR LEDs whilst they are active.

The invention has application to most forms of scanning for eye detection. The initial embodiments will be described with reference to rolling shutter systems. Embodiments relating to global shutter systems will be described further below.

Figure 1:
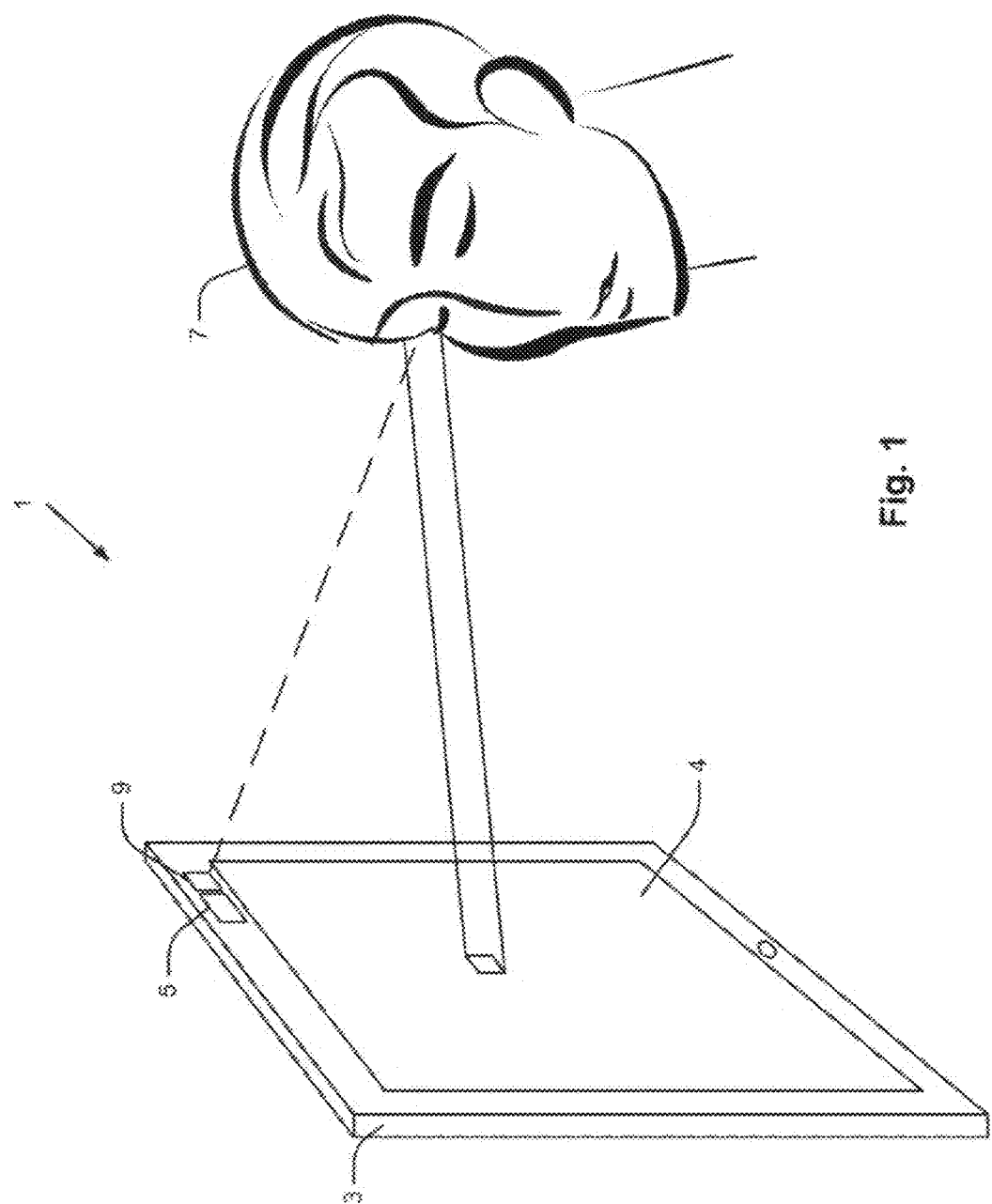
FIG. 1 is a schematic perspective view of an eye tracking system according to an embodiment of the invention.

An exemplary embodiment of the present invention is implemented on Referring initially to FIG. 1, there is illustrated an eye tracking system 1 operating on a mobile device 3 having a two-dimensional display 4. Exemplary devices include smartphones, laptop computers or tablet devices.

Device 3 includes an illumination device in the form of an infrared LED system 5 configured to project infrared light onto a subject 7. LED system 5 includes one or more LED devices which are each independently electrically controllable by a control system (described below). In the case where LED system 5 includes plural LED devices, the devices may be disposed in an array or other spatial arrangements. LED system 5 may also include one or more associated coupling optics such as an electromechanical lens to control the beam shape and direction emitted from LED system 5. In other embodiments, the illumination device may include other types of lights such as laser sources.

An image detector in the form of a camera 9 is located adjacent LED system 5. In other embodiments, camera 9 and LED system 5 are disposed at spaced apart locations but having known relative positions. Camera 9 includes a photosensitive sensor array and is configured to capture images of the illuminated subject 7, including one or both of the subject's eyes, at predetermined times coinciding with the illumination by LED system 5. Preferably camera 9 and LED system 5 are both located proximal to display 4 so as to more accurately capture the subject's eyes.

Figure 2:
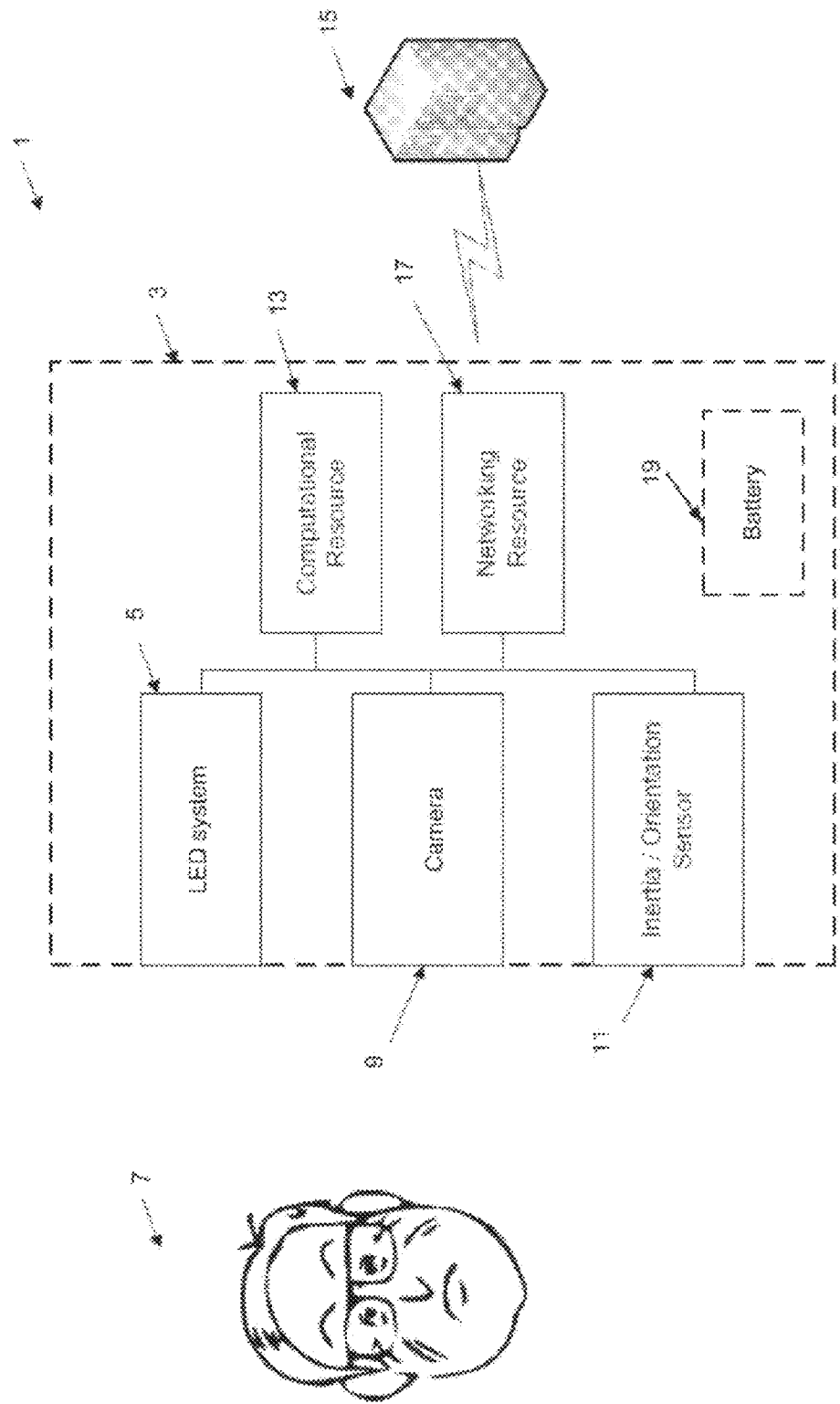
FIG. 2 illustrates an operational environment for a mobile eye tracking system.

System 1 is illustrated schematically in FIG. 2. In this environment a mobile eye tracking software application is provided on device 3 for tracking eyes of subjects within a scene. An inertia or orientation sensor 11 is responsible for maintaining the orientation of the device. Additionally significant computational resources 13 are provided for overall operational control of the system. Resources 13 include leveraging a processor and associated memory storage of device 3. Device 3 is able to be connected to external resources such as the internet, cloud resources or other servers 15 via networking resource 17. Each of the elements is powered by a local battery 19. Software controlling camera 9 is configured to control the sensor array in either a rolling shutter or global shutter type manner for imaging the scene in a progressive scanning or pulsed manner.

Although described with reference to a mobile device, the present invention is also applicable to other systems where power saving is important, such as in vehicle eye tracking systems for tracking a driver's eye(s) during operation of the vehicle. In these latter embodiments, it is preferable for the camera and illumination device to be proximal to the scene in which the user's gaze is generally directed so as to accurately capture the eyes. For example, in a vehicle, the camera and illumination device are preferably located adjacent the front vehicle window, such as on the vehicle dashboard. In this latter embodiment, battery 19 represents the vehicle's battery.

Device 3 operates under the control of programming of the computational resource 13, such that, in addition to its other operational duties, it implements the steps of an algorithm outlined below to control timing, power and direction of infrared light from LED system 5 in a more optimal manner.

LED Timing Control

Turning now to FIG. 3, in a rolling shutter system, an image scene 21 including a subject 23 having a desired eye position, is progressively scanned. In this case, the rolling shutter system 25 scans a current band 27 which moves down the scan with a predetermined velocity, integrating pixels within the band.

The overall power output is able to be lowered by only powering any illuminating LEDs at a minimum necessary output power when the specific band of pixels of the camera sensor that are predicted to image the eye, are in the process of gathering light (integrating).

To achieve this objective, the current eye position of the subject 23 is tracked within a sequence of images captured by the camera. Once the eye (or eyes) is being tracked, it can be predicted where the location of the eye regions will occur in the next image frame or specific frames within a sequence of frames. Such a prediction is based on a motion model of the eye. A basic model may use a 2D velocity or acceleration model in the image coordinates derived from the time history of eye measurements in order to predict the eye location. A more sophisticated prediction method may incorporate measurements taken from an inertial sensor on the mobile device in order to better predict the location of the eye in the next image. Motion models for other objects can be derived in a similar manner.

Only the region of the image that contains the eye is considered important to expose correctly, the rest of the image can be substantially ignored. Therefore, the IR LED(s) only need to be powered whilst the pixels on the sensor that fall in the eye region are being exposed.

An algorithm for illuminating the LED can therefore proceed as follows:
1. Acquire a current eye position using previous known eye detection methods
2. Whilst a current eye position is valid:
    For each scanned frame:
        (a) Determine an expected eye location;
        (b) Determine an eye region or band around the eye position to illuminate, utilising inertial information for the mobile device;
        (c) Determine start and stop times for band illumination;
    (d) Illuminate IR LEDs from start to stop time;

The "eye region" is actually comprised of up to two rectangular regions, one for each eye, spanning from the eye-corners and below the bottom eyelid and above the top eyelid. If one eye is not visible then it refers to only the region for the visible eye. If both eyes are visible, it can refer to two separate regions, or the bounding region that surrounds both eyes, depending on the desired embodiment.

After the eyes are tracked in the current frame, when predicting the eye region or band location for the next frame, the region may be expanded by a percentage amount in order to handle the uncertainty of prediction in order to ensure the next image shows the eye illuminated sufficiently. Further, the eye region may be shifted based on previous eye motion or positions. This expansion or shifting of the eye region may be based on the predicted eye motion determined from the motion model applied to the eye.

When the current position of the eyes is lost, the system can regress to standard techniques for imaging eye locations, say by again scanning the whole image. Alternatively, the system can be configured to sequentially expand the eye region until the eye is located again.

Typically an eye region may encompass only a few percent of the total image, and therefore for rolling shutter sensors, the aspect of power saving due to the control of the LED active period is in proportion to this percentage. In detail, for rolling shutter sensors, which expose the image row by row, it is the vertical portion of the eye image region versus the total vertical sensor resolution, which relates to the possible power savings. So if the eye image region is 100 pixels and the total sensor height is 1000 pixels, then an approximate 90% power saving can be made.

The power saving will be variable as it depends on the location and proximity of the person's eyes relative to the camera. If the eye is close enough to fill the entire image then no power saving is made by this aspect of the invention, however for hand-held mobile devices the eye typically occupies only a few percent of the image vertical dimension and the power saving can typically be in the order of 90% of the illumination power that would otherwise be required.

For a system employing a "global shutter" image sensor, because all the sensor array elements integrate photons at the same time, the light source can be synced with the electronic shutter of the sensor array so light is only produced whenever the sensor array elements are integrating, thus avoiding wasted power.

An additionally advantageous solution with a global shutter sensor is to provide very bright LED light sources which will cause the photons in the sensor elements to accumulate quickly and thus the electronic shutter can be configured to be a shorter period for the same overall optical power. The brighter light sources increase the ratio of photons from the light source(s) relative to stray photons from other miscellaneous light sources (including the sun). This has the advantage of reducing the noise effect that stray light sources may have on the object tracking image-processing component of the system. Improved object tracking then leads to more reliable and precise measurements of the object in space and therefore further reductions in overall power.

Furthermore, in the embodiments utilising global shutter image sensors, an image control algorithm can be run on a captured image to determine an image quality in terms of darkness, contrast, estimated distance to the eyes and/or other parameters. Based on the determined image quality, the illumination time for the LED light sources can be adjusted. This adjusted illumination time is utilised for illuminating the subject during the capture of a subsequent one or more images. The illumination time may be recalculated every subsequent frame or every subset of frames.

In addition to reducing power output of the LEDs, this automatic adjustment of the illumination time also has benefits in terms of safety to a user. In particular, when a user/subject is close to the camera sensor, their eyes are generally larger and are more easily detected. In response, the algorithm calculates a lower illumination time and the subject is only irradiated with infrared radiation for a short pulsed duration. In contrast, when a user/subject is further from the camera, their eyes are generally smaller and more difficult to detect. In response, the algorithm calculates a longer illumination time and the subject is irradiated with infrared radiation for a longer duration but at a larger distance. This distance/timing trade off generally results in the subject being subjected to a lower overall dosage of infrared radiation from the LEDs.

LED Power Control

Further to the above timing control of the LED(s), additional power management can be performed through operational refinements on the dynamic control of the IR optical power output. For example, the overall level of IR optical power that is incident on the eye can also be modulated or controlled in order to reduce the IR LED power drain on the battery. The optical power can be reduced when conditions are such that the IR does not need to be driven at full intensity in order to create a suitable reflection on the cornea. In particular when the eye is held close to the mobile device, or when the ambient conditions are dark.

The IR optical power incident on the eye can be controlled by a one or more of (1) modulation of LED forward drive current (either through attenuation or pulse modulation at experimentally determined variable duty-cycle of forward drive current) (2) controlling the number of LEDs illuminated at any one time (3) focusing the IR light using a dynamic lens element in front of the LED so as much of the IR light falls onto the eye region as possible (discussed below).

Normal eye tracking algorithms provide a variety of output information. These can include not only the regions in view which locate the eye in the image but also estimates of the measures of the distance to the eye (for example, distance can be estimated from scale of image features including the distance between the eyes or the apparent diameter of the iris). In further alternative embodiments, dynamic power measurements can utilize: (a) the predicted location of the eye(s) in the next image; (b) the predicted distance from the LED to the eye in the next image; (c) the ambient light as measured by the ambient light sensor on the mobile device.

Accordingly, a method for controlling the output power of the IR LEDs in an eye tracking system includes iteratively performing the steps of:
   (a) controlling the IR LEDs to illuminate the subject at a first output power level, including the subject's eye(s) for a predetermined time period;
   (b) during the predetermined time period, controlling a camera to capture an image of the illuminated subject;
   (c) processing the image to estimate the location of the subject's eyes in the image and the distance of the subject's eye(s) from the camera;
   (d) based on the estimated distance, determining a second output power level for the IR LEDs for future illumination of the subject.

This procedure may be performed in conjunction with the above procedure of controlling the illumination time of the LEDs, in either rolling shutter or global shutter image sensors. The output power level may include a common output power for each LED or different power levels for different LEDs such that the overall power level is varied. This may include the deactivation of one or more LEDs.

The above steps are performed iteratively with the second output power level replacing the first output level for illumination during subsequent images of the subject. Where a subject's eyes are estimated to be further from the LEDs, a higher output power is used. Conversely, where the subject's eyes are estimated to be closer to the LEDs, a lower power level is used.

The second power level is determined to be a minimum power level required to distinguish and detect the subject's eyes for tracking. This minimum required output power level may also be based on one or more of the ambient light detected in the image, the relative contrast levels between pixels of detected eyes and adjacent pixels, an overall darkness of the captured image or constraints applied by an empirically derived control model such as an eye geometry and/or lighting model. If the object's (in this case, eyes) material reflective properties are known in combination with a model of its geometry, and it's orientation/pose, then we are able to create a lighting model in order to predict the minimum optical power from the LED for the sensor to obtain a suitable image. Ambient illumination can further inform the lighting model. Similarly, a lighting model can be developed by statistical means, through observation of known objects (such as eyes) under various forms of illumination and observing the image they form on the sensor array. The lighting can be tuned to minimize the optical power at a known distance of the eye from the sensor and/or light-source.

Dynamic Control of the Illuminating Beam Shape

Referring to FIG. 5, there is illustrated a schematic plan view of a camera 30 illuminating a subject's head 31 and eyes 32 and 33. In this schematic, the camera's view frustum 34 substantially matches the width of the beam width 36 of the illuminating LEDs (not shown), which is substantially wider than the subject's head 31. Radiation not illuminating the subject's head 31 or eyes 32 and 33 is essentially wasted so it is desirable to minimise this radiation.

As mentioned above, it is possible to apply dynamic control to the illuminating beam defined by the IR LEDs. This dynamic control is performed by a dynamically controllable optical element or elements situated within or adjacent the LEDs. The IR optical energy can be localised to the current tracked region where the eye or eyes are projected to be. In this manner, a more optimal location of IR optical energy is provided.

Accurate determination of beam shaping requires determination of the eye location in three-dimensional space. This in turn requires knowledge of both the estimated eye position (in a two-dimensional image frame) and an estimated distance of the eye or eyes from the camera and/or LEDs. Using this information, the LED beam width and/or direction can be adjusted via the dynamic optical element to match eyeball locus geometry. Importantly, this three-dimensional information allows full beam shaping including focusing of the light onto a small area in which the eye or eyes are located. This focusing allows for further power optimisation over the simple two-dimensional beam steering methods of the prior art.

Figure 7:
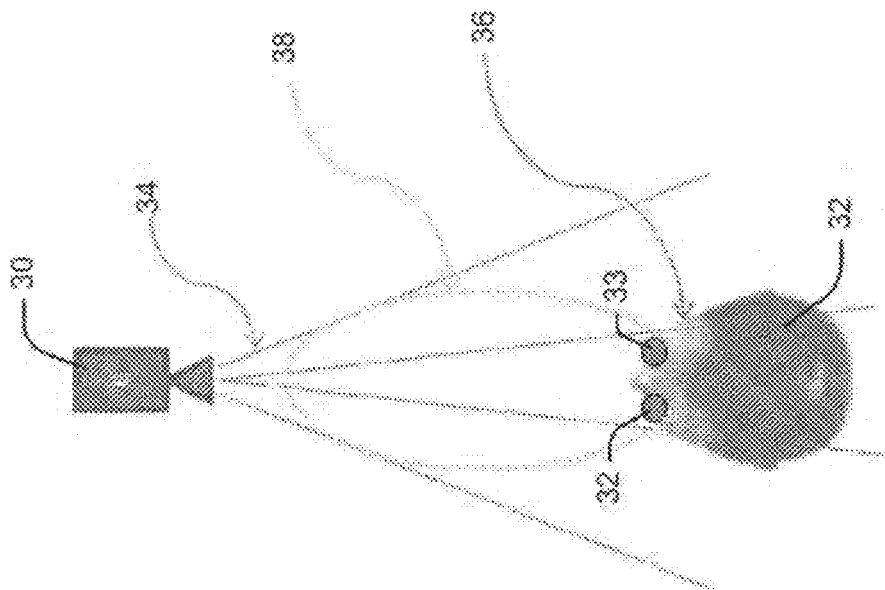
FIG. 7 illustrates a schematic plan view of camera view frustum and LED illumination beam width with reference to a subject's head, wherein the beam width is optimised to match the eyeball locus when the subject is located more distant from the camera.
Figure 6:
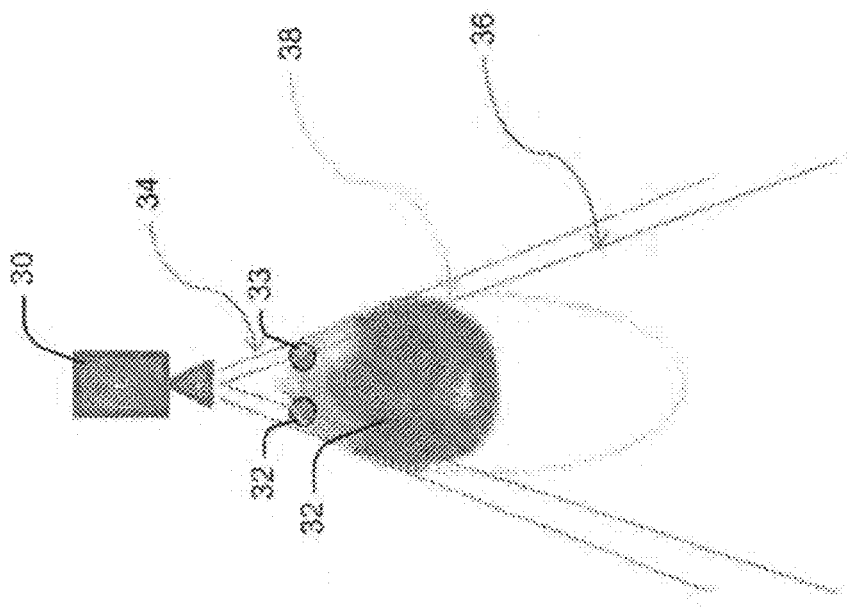
FIG. 6 illustrates a schematic plan view of camera view frustum and LED illumination beam width with reference to a subject's head, wherein the beam width is optimised to match the eyeball locus when the subject is located close to the camera.
Figure 9:
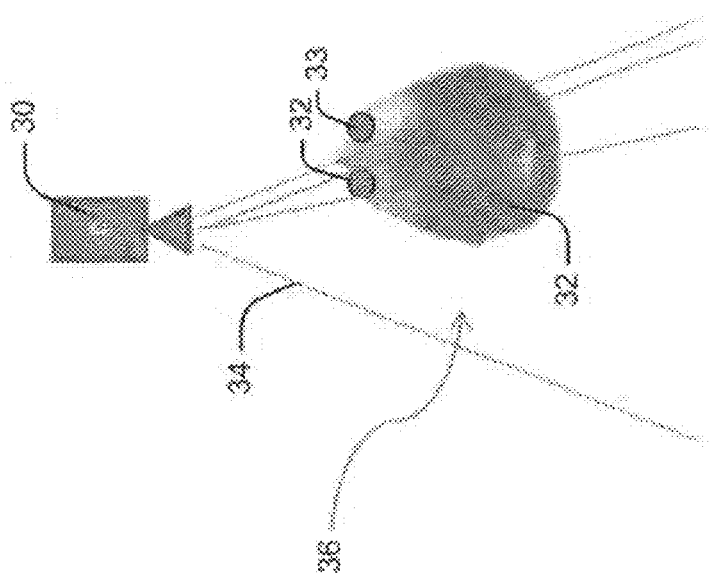
FIG. 9 illustrates a schematic plan view of camera view frustum and LED illumination beam width with reference to a subject's head, wherein only a single eye is located within the camera view frustum.
Figure 8:
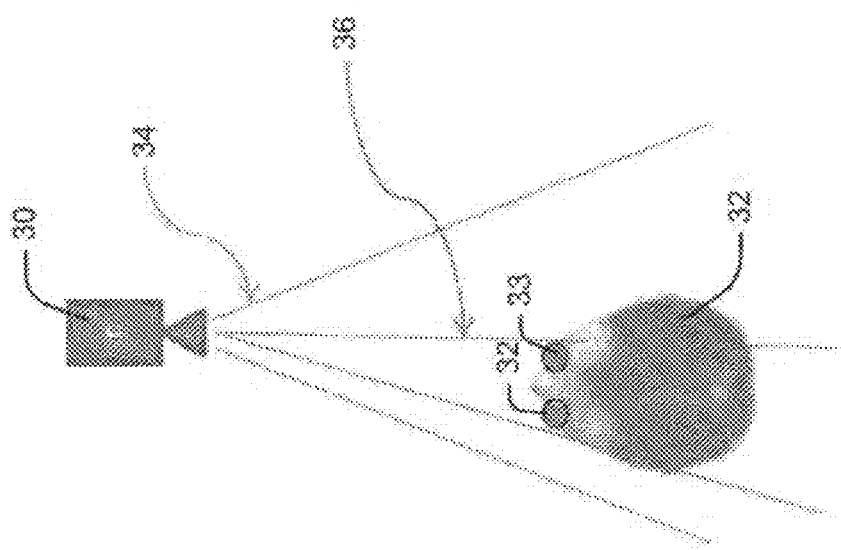
FIG. 8 illustrates a schematic plan view of camera view frustum and LED illumination beam width with reference to a subject's head, wherein the subject's eyes are located off a central axis of the LEDs.

FIGS. 6 and 7 respectively schematically illustrate cases where the LED beam width 36 is optimised to match the eyeball locus 38 when the subject is located close to camera 30 (FIG. 6) and more distant from camera 30 (FIG. 7). In the latter case, the beam width is narrowed to focus the infrared radiation only on the eye region. This optimisation in one image frame is based on eye location and distance measurements obtained in a previous image frame or a prediction of the eye location in that frame based on a motion model of the eye using a series of previous frames. In a similar manner, the direction of the LED beam can be dynamically adjusted. FIG. 8 schematically illustrates a case the subject's eyes 32 and 33 are located off a central axis of camera 30 and the LEDs. FIG. 9 schematically illustrates a case where only a single eye 32 is located within the view frustum of camera 30. In this latter case, beam width 34 is narrowed and directed to only focus on the single detected eye.

Accordingly, a method for dynamically controlling an illumination beam shape in an eye tracking system includes iteratively performing the steps of:
 (a) controlling the IR LEDs to illuminate the subject including the subject's eye(s) with a beam of infrared radiation having a predefined beam shape for a predetermined time period;
 (b) during the predetermined time period, controlling a camera to capture an infrared image of the illuminated subject;
 (c) processing the image to estimate the three dimensional location of the subject's eyes, including the two-dimensional position and the distance of the subject's eye(s) from the camera;
 (d) in response to the estimated location and distance of the eye(s), controlling a dynamic beam shaping element to focus the illumination beam at a position and distance corresponding to the subject's eye(s).

The result of the above method is that the illumination beam is focussed onto the subject's eyes independent of the subject's position within the scene being imaged and the distance of the subject's eyes from the camera.

The dynamic beam shaping element can include a number of electronically controllable optical elements, including electro optic lenses, microelectronic mirror (MEMS) arrays, liquid crystal phase modulators, interference-based optics, phased arrays, dynamic diffractive elements, prisms and combinations thereof.

CONCLUSIONS

It will be appreciated that the above disclosure provides significant systems and methods of reducing the illumination power requirements for an object tracking system. Significant power savings can be achieved, which is important in mobile and other devices having limited battery life. The power optimization focuses on three aspects:
 Only illuminating when necessary (timing the light-source activation).
 Only illuminating where necessary (shaping the light-source beam in terms of width (by focussing) and direction to emit photons only at the target).
 Only illuminating at a minimum necessary power level (controlling the power output of the illuminating LEDs to a minimum level sufficient to accurately track the object).

It will be evident that many different combinations of optional sensing elements can be utilised depending on the overall designed system. These can include: the use of an inertial sensor (if available); use of ambient light sensor (if available); use of a dynamic lens element in front of one or more IR LEDs; and the additional dynamic control over the IR optical power.

It will be appreciated that the invention is also applicable to systems and methods of tracking other objects besides eyes.

INTERPRETATION

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of varying the illumination power requirements for an object tracking system, the method including the steps of:
    (a) controlling a drive current of one or more illumination devices to illuminate the object with a beam of radiation having a predefined beam shape for a predetermined time period at a predefined power level;
    (b) during the predetermined time period, controlling a camera to capture an image of the illuminated object within a scene;
    (c) processing the image to estimate the three dimensional location of the object, including the distance of the object from the camera; and
    (d) based on the estimated distance of the object from the camera, selectively varying a start and/or end time of the predetermined time period for every subsequent frame or for a plurality of subsets of frames of a sequence of image frames.

2. The method as claimed in claim 1 wherein the object is a human face.

3. The method as claimed in claim 1 wherein the object is at least one eye.

4. The method as claimed in claim 1 wherein the beam shape is selectively varied by controlling a dynamic beam shaping element.

5. The method as claimed in claim 1 wherein the one or more illuminating devices is activated or deactivated based on the estimated three dimensional location of the object.

6. The method as claimed in claim 1 wherein the predefined power level is further selectively varied based on an ambient light detection.

7. The method as claimed in claim 1 wherein the camera includes an array of photosensors and a corresponding array of shutters which are selectively actuated in a sequential manner.

8. The method as claimed in claim 1 wherein the camera includes an array of photosensors and a single actuatable shutter to simultaneously expose each photosensor.

9. A non-transitory computer readable storage device, having computer program instructions stored thereon that, when executed by a processor, cause the processor to perform the method according to claim 1.

10. A computer system configured to perform a method according to claim 1.

11. A device configured to perform a method according to claim 1.

* * * * *